United States Patent [19]
Zenke

[11] Patent Number: 5,737,949
[45] Date of Patent: Apr. 14, 1998

[54] AUTOMOBILE ANTI-THEFT DEVICE

[76] Inventor: Howard Zenke, 124 Columbia Heights, Brooklyn, N.Y. 11201-1698

[21] Appl. No.: 895,339

[22] Filed: Jul. 16, 1997

Related U.S. Application Data

[63] Continuation of Ser. No. 370,683, Jan. 10, 1995, abandoned.

[51] Int. Cl.⁶ .................................................. B60R 25/02
[52] U.S. Cl. ........................... 70/209; 70/238; 70/261
[58] Field of Search ........................... 70/209, 237, 238, 70/261; 296/1.1; 180/287

[56] References Cited

U.S. PATENT DOCUMENTS

| | | | |
|---|---|---|---|
| 4,116,297 | 9/1978 | Ross et al. | 180/114 |
| 4,475,366 | 10/1984 | Marneris | 70/238 X |
| 4,660,878 | 4/1987 | Neverson | 296/1 R |
| 4,974,433 | 12/1990 | Wang | 70/238 X |
| 5,028,086 | 7/1991 | Smith | 296/1.1 |
| 5,213,388 | 5/1993 | Baker | 70/261 X |
| 5,251,465 | 10/1993 | Hwang | 70/238 X |
| 5,277,043 | 1/1994 | Inashvili | 70/238 |
| 5,644,937 | 7/1997 | Farino | 70/261 |

FOREIGN PATENT DOCUMENTS

| | | | |
|---|---|---|---|
| 2735782 | 11/1978 | Germany | 70/238 |
| 2248593 | 4/1992 | United Kingdom | 70/238 |
| 9009911 | 9/1990 | WIPO | 70/238 |

*Primary Examiner*—Suzanne Dino
*Attorney, Agent, or Firm*—Ostrolenk, Faber, Gerb & Soffen, LLP

[57] ABSTRACT

An anti-theft device for use with an automotive vehicle including members which restrict access to the front seat and dashboard areas of the vehicle when in an armed position and which may be removably stored in a non-use position when the vehicle is to be normally used. The access-restricting members are highly visible, thereby discouraging a potential thief because of the potential difficulty of removing the anti-theft device.

30 Claims, 5 Drawing Sheets

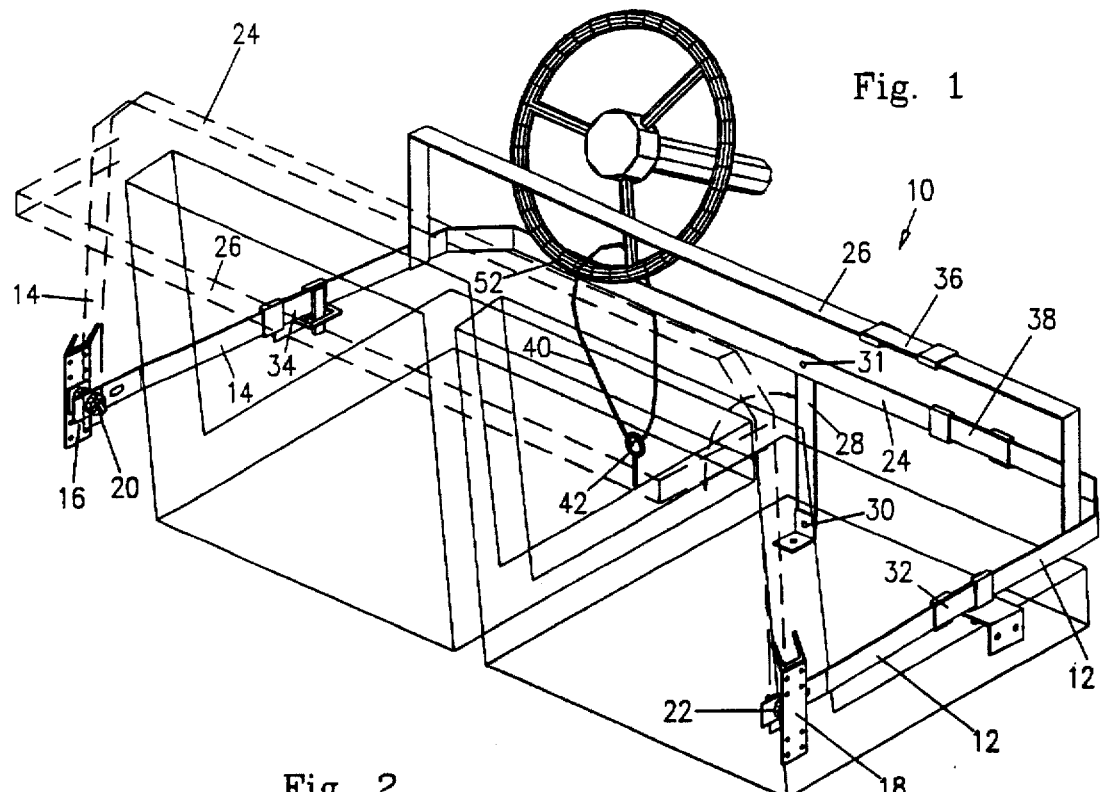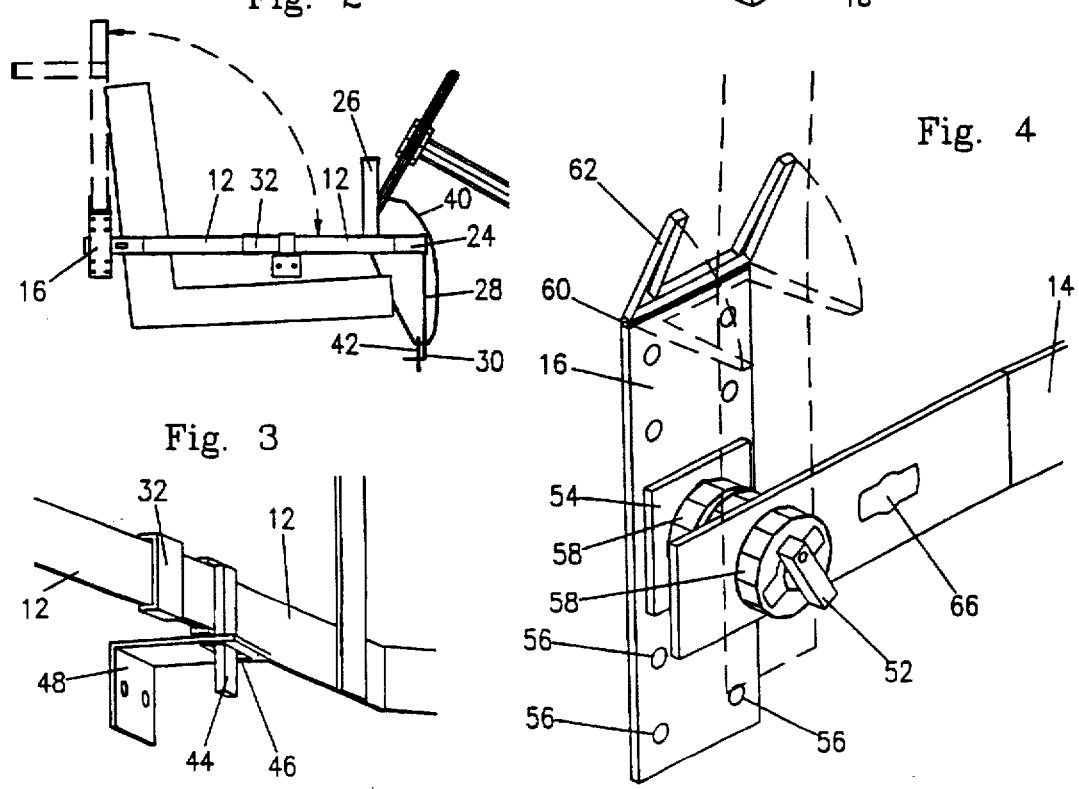

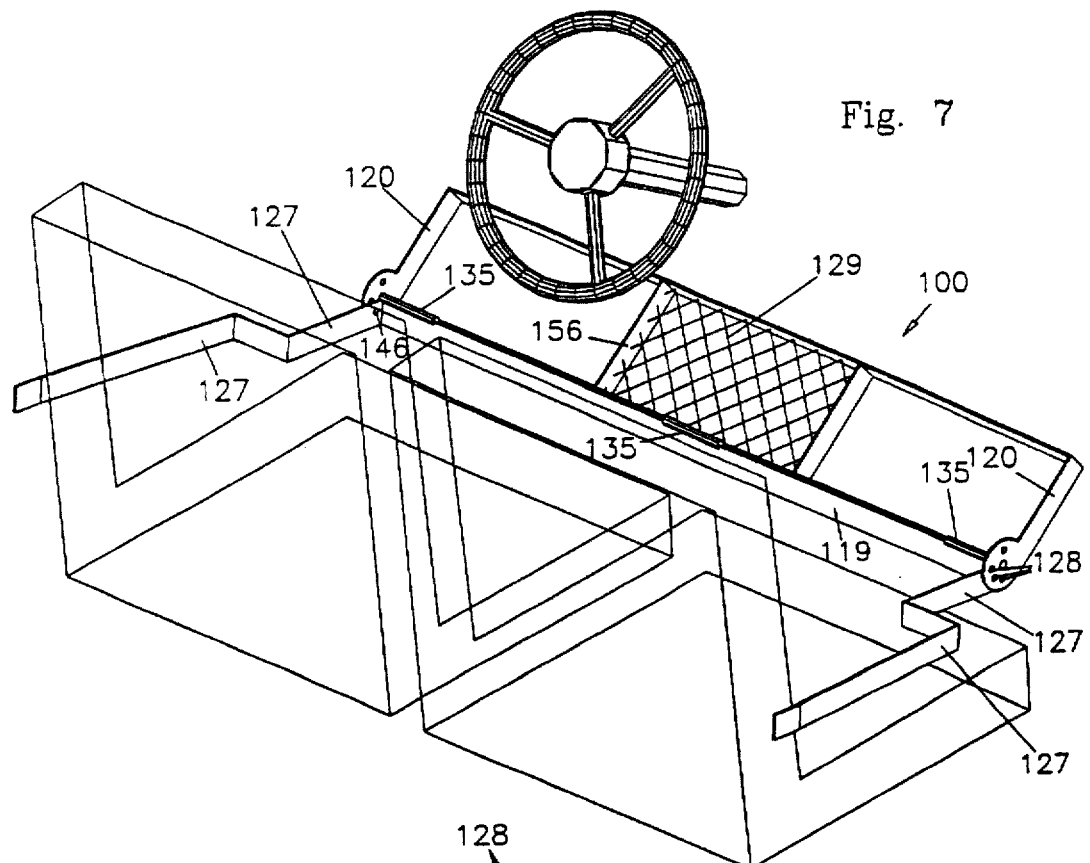
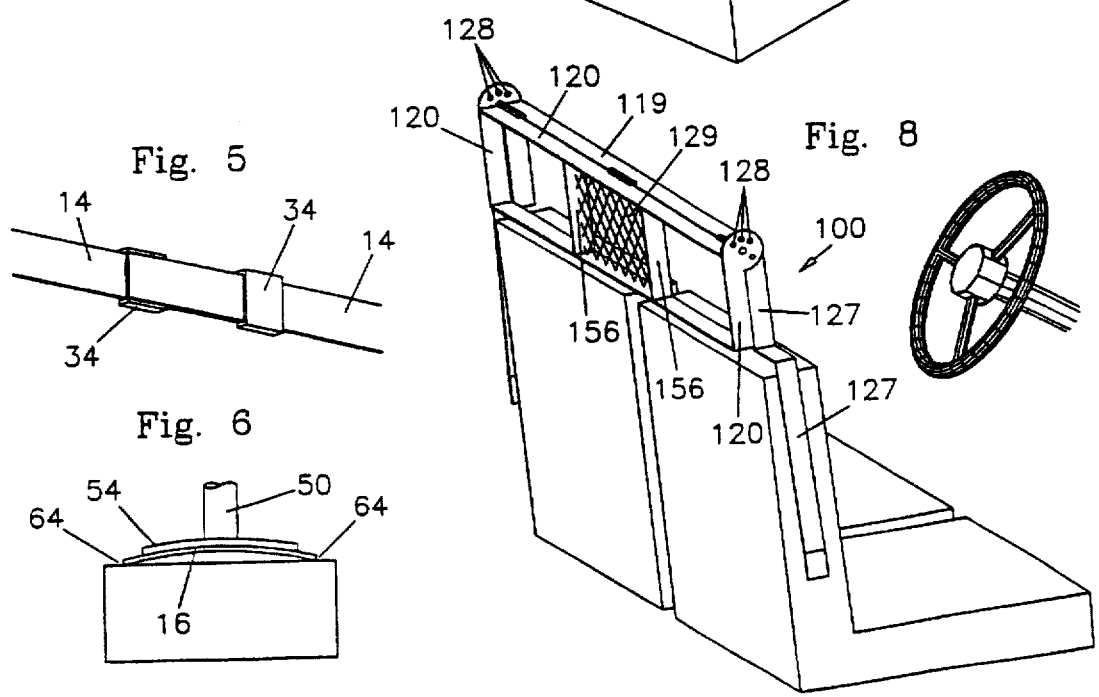

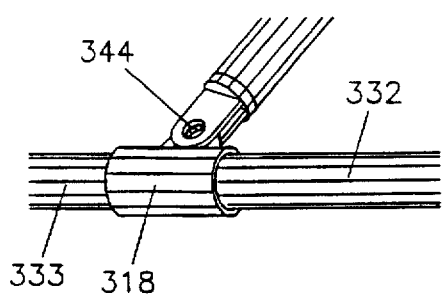
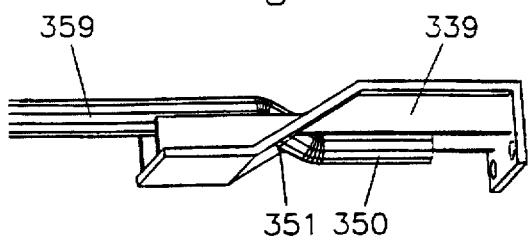
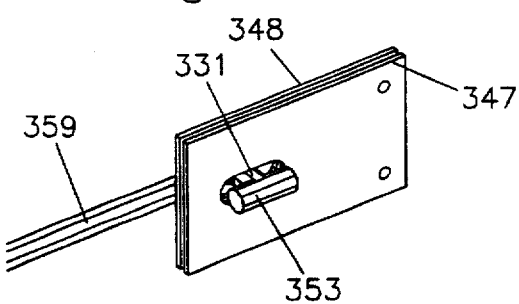
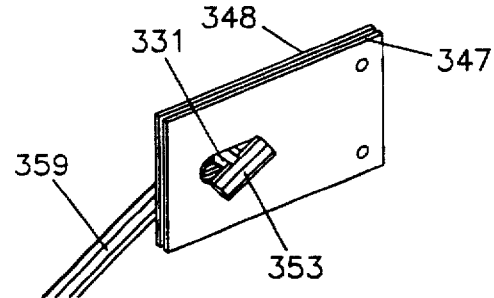
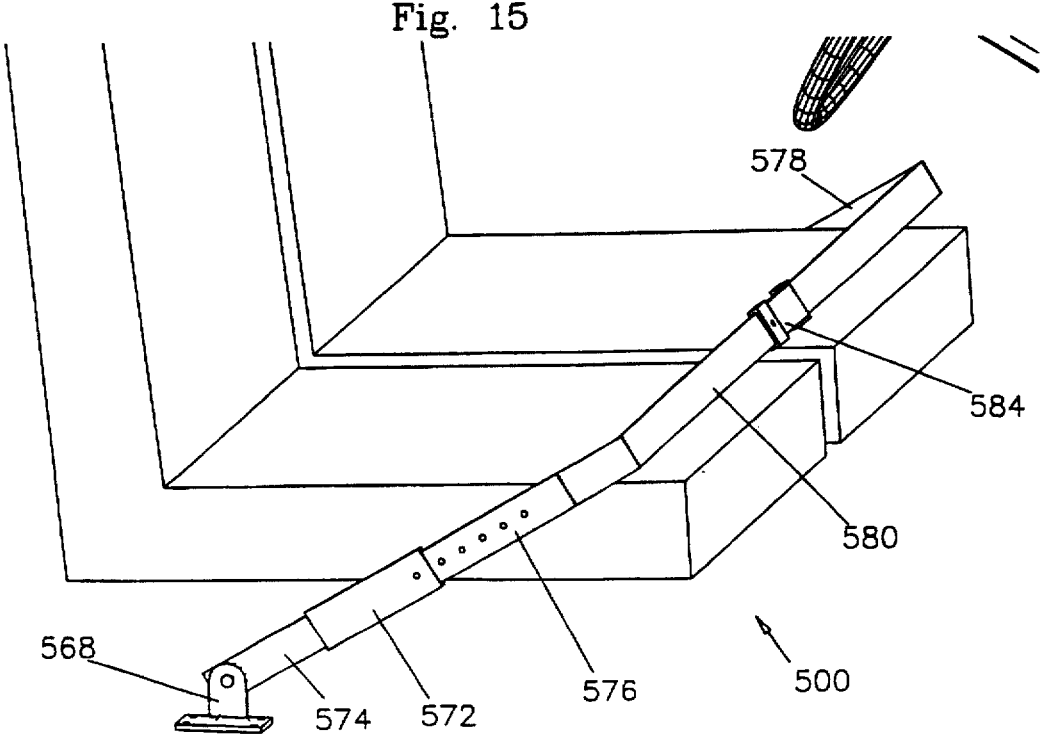

AUTOMOBILE ANTI-THEFT DEVICE

This is a Continuation of application Ser. No. 08/370,683 filed on Jan. 10, 1995, now abandoned.

BACKGROUND OF THE INVENTION

1. Field of the Invention

The present invention relates to an automobile anti-theft device, and in particular, to a barrier or frame system which can be attached in an anti-theft operational position adjacent the front seat of a vehicle, to restrict access to the front seat, the steering wheel and the dashboard of the vehicle.

2. Background Art

Automotive theft is becoming an increasing problem in present-day society. A wide variety of anti-theft devices have been developed to discourage a potential thief. There are many systems for locking the doors of an automobile to limit access to the interior, including coded combination locks, electrically operated locks and remotely operated locks, among a variety of sophisticated lock and key systems. It is also well known to provide anti-theft devices in the form of various attachments which lock the steering wheel and/or foot pedals to discourage a potential thief. Many of these devices are designed to be highly visible to discourage a thief prior to any attempt to break into the vehicle. These devices have been successful, since the stealing of an automobile with such a device would require extra effort by a potential thief and therefore another vehicle without such a protective device is usually chosen.

Specifically, there are a number of patented systems of interest, including the patent to Ross et al. (4,116,297) which shows a structure for locking the seat in a forward position against the steering wheel to limit access thereto. Another patent to Neverson (U.S. Pat. No. 4,660,878) shows a security device which is mounted to the vehicle floor to be pivotable from a flat to an upstanding position so as to restrict access to the front pedals of the vehicle. Still another apparatus is shown in the patent to Smith (U.S. Pat. No. 5,028,086), having a seat cushion frame, generally rectangular in shape, whose ends are attached to the seat and which is pivotable to be locked in place onto the steering wheel to prevent movement of the wheel and to obstruct the use of the seat.

SUMMARY OF THE INVENTION

Among the objects of the present invention are the provision of an anti-theft vehicle device which will discourage unauthorized use of a motor vehicle. Another object is to provide an anti-theft device for an automotive vehicle which is highly visible to discourage potential thieves prior to any breaking-in effort which would result in damage to the vehicle. Still another object of the present invention is to provide an automotive anti-theft device which restricts access to the seat, steering wheel and dashboard equipment of the vehicle.

A further object of the present invention is to provide an anti-theft device which may be installed as original equipment or which may be used with a wide variety of differently sized and shaped vehicle interiors, the device including adjustable components.

Yet another object of the present invention is to provide an automotive vehicle anti-theft device which is easy to construct, manufacture and install and which is easy to use by a vehicle owner to secure the vehicle to inhibit or discourage potential thieves.

According to an aspect of the present invention, an automobile anti-theft system is arranged so as to restrict access to the front seat of a vehicle. A preferred embodiment takes the form of a highly visible pivotable frame which is attached on either side of the front seat of the vehicle either to the floor or to door post columns, for example. In a non-use position, the frame stands upright and occupies unused space adjacent to the sides and above the front seat below the interior roof of the vehicle. In an armed position, the frame is pivoted downwardly approximately 90° so that it lies with a first portion of the frame adjacent the dashboard across the width of the front seating section and a second portion of the frame spaced from and slightly above the first frame portion to completely inhibit access to the front seat itself. The frame assembly is locked in the armed position by a locking device which creates difficult access to a potential thief but which is easily unlocked by the owner of the vehicle to allow normal use of the vehicle.

The anti-theft frame assembly of this embodiment may be included as original equipment or may be purchased separately and added on at a later time. The anti-theft system may be provided with adjustable components in order to accommodate various-sized vehicles when sold in the aftermarket. If the equipment is original, some adjustable components may not be necessary since most components may be precisely sized to fit the vehicle to which it is attached.

Another embodiment of the present invention takes the form of elongated telescoping bar members which extend diagonally across the seat and foot areas of the front seat section of the vehicle. At least one of the elongated bars is pivotably connected with respect to the other to accommodate various-sized vehicles.

Yet another embodiment of the invention is formed by at least a single cross piece which extends across the front seat of the vehicle and which is mounted on the floor adjacent the sides of the seat between the seat and the doors of the vehicle.

Still another embodiment of the invention is formed by a pair of cross pieces which extend across the front seat of a vehicle and which are mounted on a floor plate directly in front of the seat. This embodiment permits storage of the device under the seat when not in use.

Other objects, features and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a perspective view of a first embodiment of a frame security system in accordance with the present invention. FIG. 2 is a side elevation view of the security system of FIG. 1.

FIG. 3 is a detail of the system of FIG. 1.

FIG. 4 is a detail of the system of FIG. 1.

FIG. 5 is a detail of FIG. 1.

FIG. 6 is a detail of FIG. 1.

FIG. 7 is a perspective view of a second embodiment of the security system in accordance with the present invention.

FIG. 8 is another perspective view of the system of FIG. 7.

FIG. 11 shows a pivotable extension in the embodiment of FIG. 10.

FIG. 12 shows a locking plate for supporting a rod.

FIG. 13 shows another locking device for supporting a rod, in an unlocked position.

FIG. 14 shows the locking device of FIG. 13 in a locked position.

FIG. 15 is a perspective view of a fifth embodiment of the present invention.

DESCRIPTION OF PREFERRED EMBODIMENTS

Figure 9:
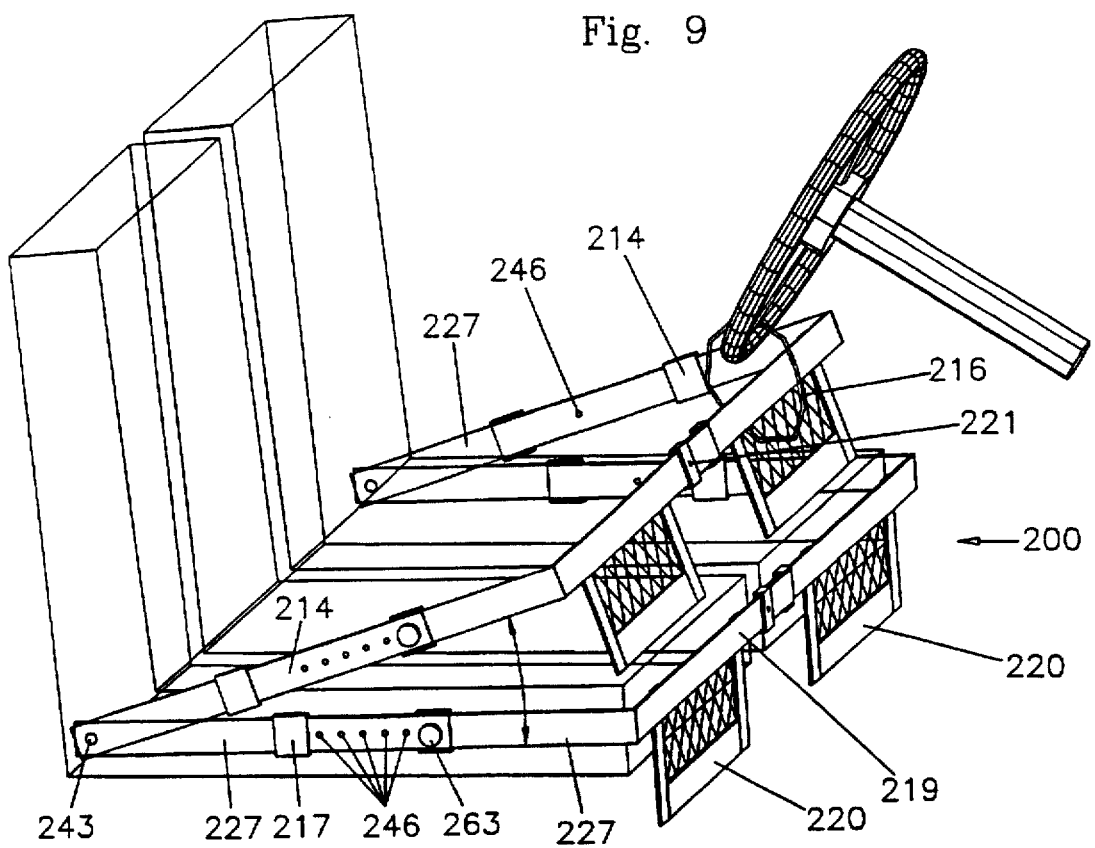
FIG. 9 is a perspective view of a third embodiment of the system of the present invention.
Figure 10:
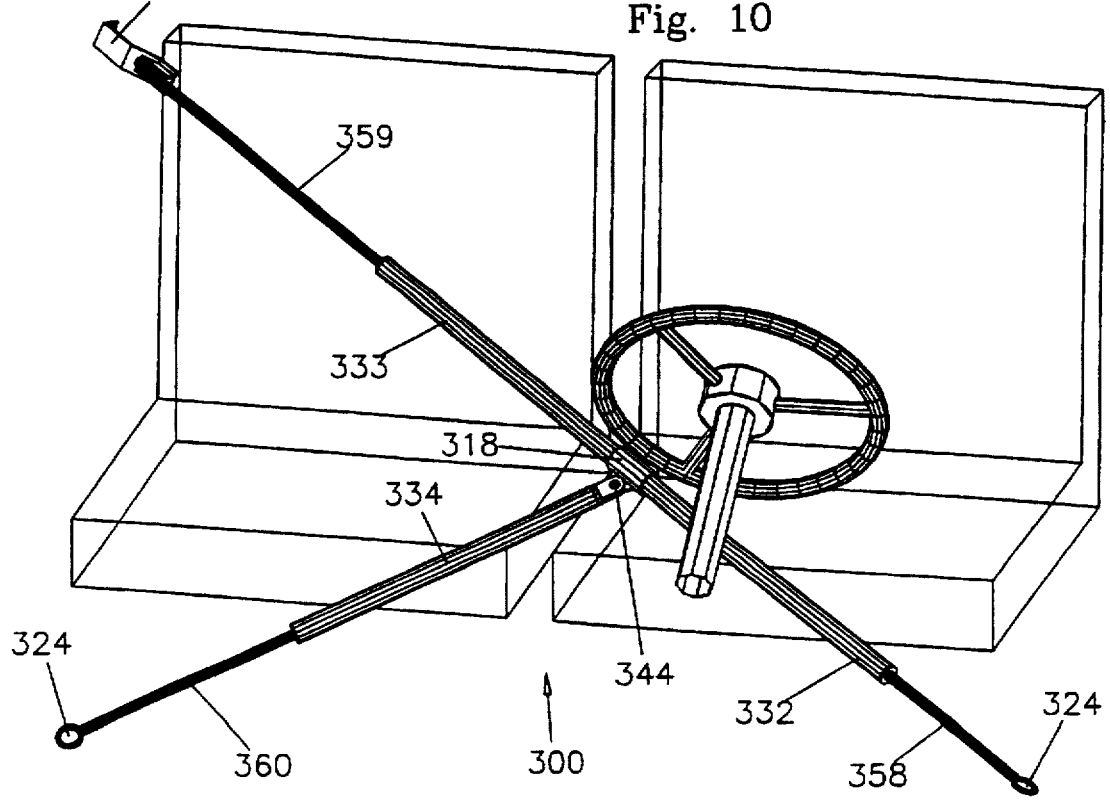
FIG. 10 is a perspective view of a fourth embodiment of the present invention.

Several detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to the drawings, FIGS. 1–6 show a first embodiment of an automotive anti-theft device of the present invention. The anti-theft device 10 includes a frame system formed of a pair of side frame arms 12 and 14 which are pivotably mounted to a door frame of an automobile by mounting plates 16 and 18 which will be described in detail herein below.

The arms 12 and 14 rotate about pivots 20 and 22 which are shown in detail in FIG. 4. The arms 12 and 14 are attached to a first cross bar 24 which extends across the ends of the arms 12 and 14 and a second cross bar 26 positioned at a 90° angle above the arms 12 and 14. The bars 24 and 26 extend the entire width of the interior cabin of the vehicle.

Referring to FIGS. 1 and 2, the frame assembly is shown in an armed position with the various frame elements extending across the seating area of the vehicle being protected, thereby limiting access to the front seats. The dotted lines in FIGS. 1 and 2 show the frame assembly in a stored position with the frame arms upright in a vertical direction toward the roof of the vehicle. The cross bars are adjacent the roof of the vehicle in the stored position, out of the way of the occupants of the vehicle. In the armed position, the frame members are across the front of the seat, the steering wheel and the dashboard, thus limiting access not only to the seat but to the steering wheel and dashboard components to discourage a would-be thief. As seen in FIG. 2, cross bar 26 extends upwardly across the bottom of the steering wheel such that the bottom of the steering wheel may be located below part of cross bar 26, and such that cross bar 24 extends beyond the bottom of the steering wheel in the direction away from the hinges 20 and 22.

In a preferred embodiment, cross bar 24 is arranged for being locked to a bar arm 28 which is upwardly pivotably attached to a support 30 that is bolted to the floor of the vehicle. An upwardly extending free end of the bar arm 28 includes an opening not shown, which cooperates with an opening 31 in the cross bar 24. With these openings in registration, a conventional lock or other fastener device may be inserted therethrough, thereby locking the frame assembly in the lower armed position. An alternate locking device may be used to secure the device 10 in the armed position. A chain 40 may be looped through the steering wheel, around the cross bar 24 and through an eyebolt 42 which is secured into the floor of the vehicle.

Preferably, the frame arms 12 and 14 and the cross bars 24 and 26 are made from unitary elongated lengths of high strength metal which is formed into the frame arm and cross bar configuration. The ends of the second cross bar 26 are attached by welding or other suitable fasteners to the frame arms 12 and 14 so the cross bar 26 extends upwardly at approximately a right angle configuration with respect to the first cross bar 24. This dual bar construction greatly limits access to the front seat compartment. When the system is installed as original factory equipment, it will be appreciated that the precise length and width of these elements may be determined by the specific size and make of the vehicle to which it is attached. However, when the anti-theft device is sold in the aftermarket, it may become necessary for the various elements to be adjustable in length to accommodate various-sized vehicles. It will be appreciated that FIGS. 1 and 2 show the device 10 with adjustable joints 32, 34, 36 and 38 in the arms 12, 14, 24 and 26, respectively.

The anti-theft device 10 also includes an auxiliary locking mechanism for preventing the front doors of the vehicle being secured from being opened from the outside. As shown in FIG. 3, a pin 44 is formed with or attached to each of the side arms 12 and 14. The pin 44 cooperates with a slotted opening 46 in a bracket 48 secured to the door. In this embodiment the auxiliary locking mechanism can only be operated through the rear doors of the vehicle, and thus this feature cannot be used conveniently with two-door vehicles. Alternatively, an electronic or electromechanical lock (not shown) could be provided which would be operable from outside the vehicle.

FIG. 4 shows a detailed view of the left side door frame mounting plate 16. It will be appreciated that the plate 18 on the opposite side door frame is a mirror image thereof. A shaft 50 (FIG. 6) is attached to the plate 16 and engages an opening in the side frame arm 14, permitting the side arms 12 and 14 and the cross bars 24 and 26 to be removably attached and to be pivotably moveable thereon. The side door frame mounting plate 16 includes a locking bar 52 and a security plate 54 which covers at least four of the screws 56 used to mount the plate 16 to the door frame. Washer inserts 58 locate the side arm 14 relative to the door frame post and also cover the screws (not shown) for the security plate 54, thereby preventing removal of the plate 16 when the anti-theft device 10 is in its locked position. The washer inserts 58 also serve to adapt the anti-theft device 10 to vehicles with different widths between the door posts, since the inserts 58 may be placed on either side of the end of the arm 14 being mounted to the door post.

The upper end of the side door frame mounting plate 16 is connected to a hinge 60 which in turn connects a simple but effective two-pronged locking bracket 62 to the mounting plate 16. When the side arm 14 is positioned in its vertical or stored position, the bracket 62 is pivoted downwardly so its prongs snugly engage the side arm 14, keeping it in place and also preventing excessive rattling noise. The prongs of the bracket 62 are advantageously tapered as shown for a better friction-fit with the side arm 14.

Preferably, the side door frame mounting plate 16 is slightly concave in configuration, as shown in FIG. 6, to enable the side edges 64 of the plate 16 to snugly engage any fabric or plastic covering on the door frame post. When the plate 16 is mounted on the door frame post, this firm fit at the side edges 64 hinders any attempt by a thief to pry or dislodge the plate 16, making the vehicle further unattractive as a potential target for theft. The locking bar 52 is offset about 30° from the perpendicular axis of the mounting plate 16. The side arm 14 includes openings 66, only one being shown in FIG. 4, which are on the same axial line as the arm itself. The arm 14 is attached to the mounting plate 16 by rotating the arm 14 rearwardly about 30° until one of the openings 66 matches the shaft 50. Once in place, the locking bar 52 secures the arm 14 in place. This attachment feature permits the anti-theft device 10 to be removed completely from the vehicle if it is not needed. Because the several openings 66 in the arm 14 are spaced along the arm, the overall length of the arm 14 may be sized to fit a particular vehicle.

FIGS. 7 and 8 illustrate a second embodiment of an anti-theft device 100 in accordance with the present invention, which is of a fixed length in this example and designed to be used as original equipment on a vehicle. In this embodiment, side arm bars 127 are fixed in length. The ends of the side arm bars 127 are connected to a first cross bar 119 and a second hinge-attached U-shaped cross bar 120, also of fixed length, that pivots from the cross bar 119. In the stored position, shown in FIG. 8, the cross bar 120 folds rearwardly and adjacent to the cross bar 119 using hinges 135. This feature permits the cross bar 120 to be stored behind the top part of the seat backs. This fold feature also permits the cross arm bar 120 to easily clear the steering wheel when being moved into and out of its operating position.

The connection point between the cross arm bar 120 and the cross bar 119 is provided with a locking joint having locking holes 128 which allow the cross bar 120 to be located in a plurality of different locking positions, each at a different angle for providing optimal obstruction of use of the vehicle, for example just under and behind the steering wheel as shown. The locking holes 128 match up with a single locking member 146 on each side arm bar 127. Cross struts 156 provide additional support and the spaces between the struts 156 and the cross bar 120 may be filled with wire mesh 129, which further restricts access to the dashboard when the device 100 is in the armed position. For purposes of illustration only, the central opening is shown with the wire mesh 129. However, it is contemplated that all spaces between the struts 156 and the cross bar 120 will be so filled.

In the embodiment shown in FIGS. 7 and 8, it is possible to include head rests (not shown) in the cross bar 120, which will be positioned on top of the seats when the device 100 is in the stored position, thus eliminating the need for conventional head rests on the seats.

FIG. 9 illustrates a third embodiment of an anti-theft device 200 which is stored in an area in front of, and below, the front seat. Side arms 227 include pivots 243 which are attached to each door post, or to the floor, which permit the device 200 to be rotated upwardly across the front seat into the armed position. A frontal cross bar 219 is integrally formed with the side arms 227. Extensions 220 project downwardly from the cross bar 219 and further block access to the front seat of the vehicle when the device 200 is in the armed position. Side arms 227 include an adjustable section 214 with a slider 217 and pin (not shown) which cooperate with a series of spaced holes 246 to increase the length of the side arms 227 for storage, so the cross bar 219 and extensions 220 may be stored close to the front seat out of the way of the driver and front seat passenger of the vehicle. A locking screw 263 keeps the two sections of the side arms 227 at a preselected storage length. The cross bar 219 also is provided with an adjustable section 221.

In the armed position, the length of the side arms 227 may be adjusted so the extensions 220 rest on the upper surface of the front seat of the vehicle. The extension 220 may be locked in this position to restrict access to the front seat of the vehicle. A chain 216 may also be looped around the steering wheel of the vehicle and the cross bar 219 to prevent moving of the device 200 when it is in the armed position. Because the overall length of the device 200 is adjustable, the arms 227 and cross bar 219 may be adjusted to rest against the dashboard of the vehicle to restrict access to components such as a radio or tape player.

The security systems described hereinabove are clearly visible to any potential thief, thereby discouraging any attempt at theft, unlike other security systems which do not become apparent until a theft is actually initiated.

Still another embodiment of an anti-theft device 300 of the present invention is shown in FIGS. 10 to 14. The device 300 is formed of three tubular housings 332, 333 and 334. Housings 332 and 333 are aligned and housing 334 is angularly positioned to the first two using a housing connector 318 having a pivotable extension 344 for connection with housing 334. FIG. 11 shows a detailed view of the housing connector 318. Each housing is provided with a telescopic shaft or rod 358, 359 and 360, respectively.

Preferably, the ends of the rods 358 and 360 are provided with eye bolts 324 or other rounded surfaces to enable the device 300 to attach on the floor of the front passenger compartment of the vehicle. The end of rod 359 connects to a locking device which is permanently attached to the door frame of the vehicle. One embodiment of the device takes the form of a locking plate 339 as shown in detail in FIG. 12. The plate 339 includes a slot 351 which supports and offsets end 350 of the rod 359 to maintain the rod in position.

A second arrangement of a locking device for rod 359 is shown in FIGS. 13 and 14, including plates 347 and 348, which are securely attached to the door frame and the door post. The plates 347 and 348 include a plate locking slot 331 which cooperates with a locking bar 353 attached to and offset from the end of the rod 359. FIG. 13 shows the rod 359 generally parallel to the plate locking slot 331 so the locking bar 353 is able to pass therethrough. Rotation of the rod 359 causes the locking bar 353 to become securely locked to the plates 347 and 348.

In a stored condition, the rods 358, 359 and 360 are telescopically positioned within the housings 332, 333 and 334, so the overall length of the device is relatively compact, for example approximately 40 inches in length, permitting it to be stored inside the vehicle or in the trunk when not in use. Housing 334 and rod 360 may be pivoted for storage against housing 333 using the pivotable extension 344.

When the device 300 is extended to its armed position, the rods 358, 359 and 360 are pulled outwardly from the respective housings 332, 333 and 334. Rod 359 is attached to the door frame using one of the above-described locking devices so housings 332 and 333 and rods 358 and 359 extend diagonally across the front seat of the vehicle. Rod 360 and housing 334 extend diagonally across the opposite side of the front seat. Preferably, the eyebolts 324 on the ends of rods 358 and 360 may be locked to suitable latches or locks (not shown) on the floor of the front seat compartment of the vehicle. The diagonal positioning of the device 300 effectively restricts access to the seating and foot areas of the front seat compartment, as well as restricting access to at least a portion of the dashboard.

Referring to FIG. 15, yet another embodiment of an anti-theft device 500 is shown mounted directly to the floor of the vehicle adjacent the seat. The device includes mounting plates 568 which are bolted to the floor adjacent the seat. A pair of side arms 576 and 578 are telescopically connected by means of an adjustable housing joint 572 to a connector 574 pivotably attached to the mounting plate 568. A cross bar 580 and adjustable joint 584 are connected to the side arms 576 and 578 and extend upwardly across the front of the seat in the armed position. It will be appreciated that this embodiment may include a second cross bar perpendicularly disposed to the cross bar 580 as with the embodiment described in FIGS. 1 to 6 hereinabove. It will also be appreciated that a variety of locking means can also be provided with the floor mounted embodiment, of the same general type as disclosed with respect to the first embodiment hereinabove.

Figure 16:
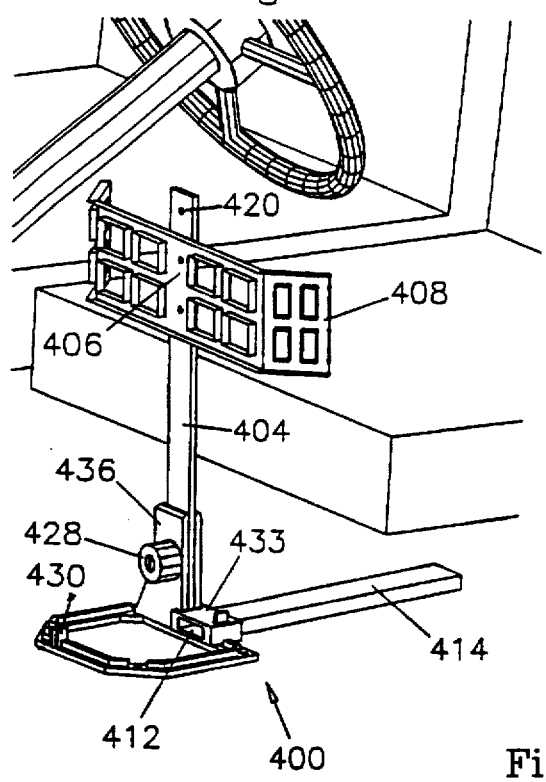
FIG. 16 shows a sixth embodiment of the present invention in its armed position.
Figure 18:
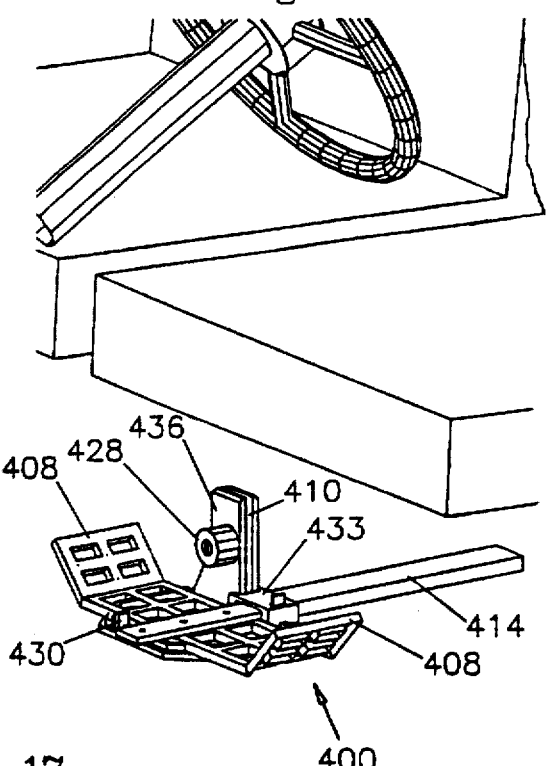
FIG. 18 shows the sixth embodiment in its storage position.
Figure 17:
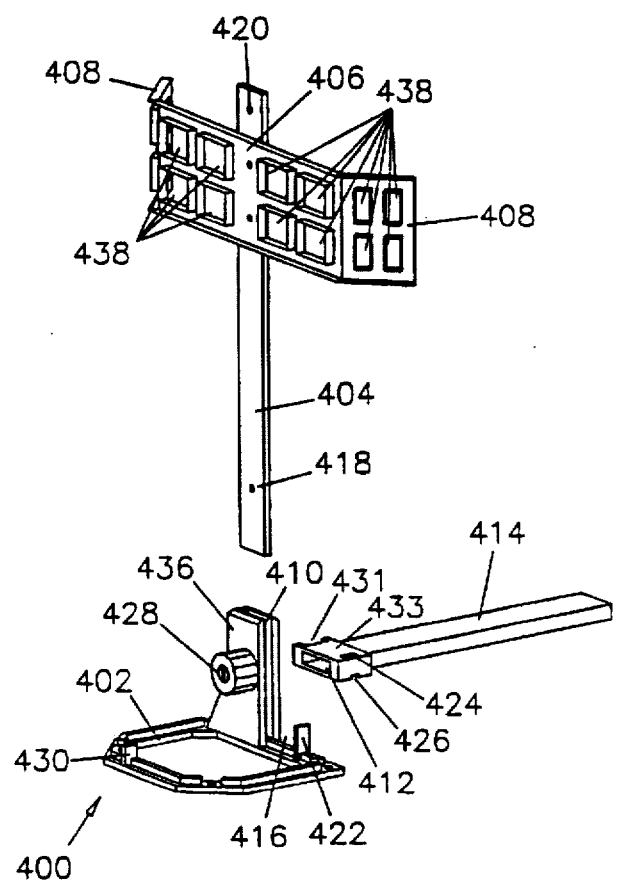
FIG. 17 is an exploded view of the sixth embodiment.

FIGS. 16, 17 and 18 show a sixth embodiment of an anti-theft device 400, which stores under the front seat of the vehicle, and in its armed position, blocks access to the foot pedal and the seating area. A floor plate 402 bolts to the floor in the unused area in front of the seat, well behind the area in which the feet are placed by the driver in a normal driving position. In a vehicle floor which has been weakened by rust, a separate reinforcing plate (not shown) can be installed on the underside of the vehicle floor for receiving the mounting bolts of the floor plate 402. The bolts are locked with a suitable locking fluid.

The anti-theft device includes a cross piece 406, having extensions 408 at its ends which are angled toward the seat from the cross piece 406. The cross piece is connected to an elongated arm member 404 which is attachable vertically to the floor plate 402 in the armed position. The floor plate 402 includes a vertical member 436 with an opening 410 which is structured to receive the arm member 404 when the device 400 is in its armed position as shown in FIG. 16.

The arm member 404 includes a lock opening 418 located in the lower portion of the arm 404. The lock opening 424 cooperates with a lock 428, which may be a pin lock as shown, which is formed as part of the casting of the vertical member 436. Alternatively a common padlock may be used. As another alternative, if a built-in lock is positioned in the vertical member 436 so that a key is required to be inserted from the back of the upright vertical member (i.e. from under the seat), it cannot be accessed easily to jimmy, etc. The lock prevents the anti-theft device 400 from being removed when it is in its armed position.

FIG. 17 is an exploded view showing the parts of the three-piece assembly. The floor plate 402 bolts to the floor in the unused area in front of the seat, well behind the area needed for the feet to rest, etc. Its 90 degree angle with respect to the arm 404 conveniently positions the cross piece 406 across the front seat area to prevent access to the front seat and the foot pedal area, and facilitates compact storage in a space close to the front seat and adjacent an unused floor area when not in use.

Vertical member 436 also has a bracket or sleeve head 433 attached. In the stored position shown in FIG. 18, arm member 404 extends under the seat, through a slot 412 in the sleeve head 433, so that the cross piece 406 abuts against or near the floor plate 402 and vertical member 436 in a position out of the way of the legs of the driver when the automobile is operated. The arm 404 slides into a slit-shaped opening 412 in sleeve head 433, such that the arm 404 is disposed under the seat for storage. A plastic sleeve 414 serves as a lining for the opening 412 so as to guide the arm 404 to slide into the opening 412.

Sleeve head 433 has a recess 431 formed by a pair of parallel flanges that allows it to be attached to the vertical member 436. A sleeve pin 422 formed vertically in the floor plate 402 engages a sleeve pin opening 424 to hold the sleeve head in place. The sleeve head 433 can move up and down, guided by the sleeve pin 422, to a position to enable it to avoid obstructions under the seat, such as electric seat drive elements. The flat shape of the arm 404 further assists the arm 404 to avoid obstructions under the seat. The slot 412 may have a beveled opening and may accommodate a plastic sleeve 414 into which the arm 404 fits for storage. The plastic sleeve guides the arm so as to facilitate inserting the arm around any mechanical obstructions under the seat. A storage pin 430 prevents the arm 404 from moving forward once stored.

A plastic cap (not shown) may fit over storage pin 430 to hold the stored arm 404 tightly and prevent rattling. The floor plate 402 is sized so as to accommodate approximately a 4-inch width of the crosspiece 406 between the vertical member 436 and the storage pin 430 and permit such plastic cap to hold the arm 404 tightly.

In the armed position shown in FIG. 16, the opening 410 in the upright vertical member 436 permits arm 404 to slide into it vertically. The flat shape of the arm 404 simplifies the inserting process, as well as simplifying the structure of the vertical member 436, in addition to avoiding underseat obstructions as mentioned above. Thus the flat shape of the arm 404 is highly advantageous. When the arm 404 is fully seated in the opening slot 410 against the interior walls of the member 436, the lock 428 may be aligned with one of the lock holes 418 (only one being shown in FIG. 17), so as to precisely position the cross piece 406, in approximately 1-inch increments, for example, at a selected optimum height above the front seat. Thus cross piece 406 can be positioned close enough to the seat so a person's legs cannot pass through, under the cross piece 406, to the pedals. Further, cross piece 406 can extend upward close enough to the lower part of the steering wheel to prevent a person from accessing the foot pedal area by placing the legs over the top of the cross piece 406 to operate the vehicle.

FIG. 16 shows the device in its armed position on the driver's side of the vehicle. A similar device at the middle of the vehicle or on the passenger's side with a longer arm 404 with longer cross pieces 406 and 408 would further protect the dashboard from access, to remove a radio or tape player, etc., for example from the direction of the passenger's side.

As best seen in FIG. 17, the cross piece 406 has two extensions 408 at its ends which are angled slightly in a direction toward the vehicle seat. The cross piece 406 has two mounting holes and the arm 404 has three corresponding mounting holes 420, for example, which permit setting the cross piece at two different distances above the seat. One setting may be two inches above the other, for example. Additional mounting holes may be provided.

After the correct height is determined for blocking the area in front of the vehicle seat, the cross piece 406 is permanently attached to the arm 404. Bolts can be threaded into the openings 420 and permanently secured with a conventional sealant which locks the threads. The heads of the bolts preferably have small holes (not shown) for receiving a special wrench or pin for turning them. It should be possible with this arrangement to turn the bolts in order to insert them with the locking fluid, but not for a thief to turn them in order to remove them after they have been sealed.

The cross piece 406 and extensions 408 are preferably stamped from steel of sufficient thickness (for example 1/16 to 1/8 inch) that they are not easy to bend. For additional strength, openings 438 are stamped and then 90-degree bends are made in the material at the sides of the openings 438.

The cross piece and extensions are wide enough to extend across the seating area and in such close proximity to the seat front that it effectively prevents access to the seating area and the foot pedals.

The plastic sleeve 414 removably attaches to the base plate 402 by fitting into the opening 416 which is defined between the vertical member 436 and a sleeve pin 422 which extends vertically from the base plate 402. If desired the sleeve can be glued or otherwise attached in fixed position in relation to the base plate. A sleeve groove 426 is provided on the bottom side of the sleeve head 433 for engaging an upwardly facing ridge on the base plate 402 when the sleeve head 433 is in its lowermost position.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An anti-theft device for an automotive vehicle for restricting access to a front seat area and a dashboard area of said vehicle, said device comprising:
   a first pair of side arms and corresponding hinge devices respectively arranged for pivotably attaching proximal ends of said side arms directly to a body of said vehicle adjacent to sides of the front seat area of said vehicle;
   at least a first cross bar attached to distal ends of said side arms, for extending said first cross bar transversely across said front seat area of said vehicle in an armed position; and
   said side arms and said cross bar being pivotable for being positioned away from said front seat area in a storage position during normal use of said vehicle.

2. The anti-theft device of claim 1, further comprising a locking device operable to lock said device in the armed position.

3. The anti-theft device of claim 2, wherein said locking device comprises a loop of material positioned through the steering wheel of said vehicle and the said first cross bar.

4. The anti-theft device of claim 2, wherein said locking device comprises a bar member having a first end for being attached to the floor of said vehicle and a second end attachable to said first cross bar.

5. The anti-theft device of claim 2, wherein said side arms and said cross bar include joints for adjusting the length thereof.

6. The anti-theft device of claim 1, further including locks for locking said side arms in the storage position.

7. The anti-theft device of claim 6, wherein each said lock includes a slotted member for being attached to one of said vehicle and said side arm, and a projection for being attached to the other of said vehicle and said side arm, said projection engaging said slotted member.

8. The anti-theft device of claim 7, wherein said slotted member is for being attached to said side arm and said projection is for being attached to said vehicle.

9. The anti-theft device of claim 7, wherein said projection is engageable with said slotted member at a plurality of different locations along the length of said side arm for adjusting the location of said anti-theft device in said front seat area.

10. The anti-theft device of claim 1, further including a pair of mounting plates for rigid attachment to door frames or floor of said vehicle and pivots for connecting said side arms respectively to said mounting plate.

11. The anti-theft device of claim 10, further including attachments at said pivots for adjustably attaching said side arms thereto.

12. The anti-theft device of claim 10, further including a pair of brackets, said brackets being for rigid attachment to door frames or floor of said vehicle, said brackets being disposed for engaging said side arms when in said armed position.

13. The anti-theft device of claim 1, wherein said first cross bar further includes an extension member extending downwardly therefrom, said extension member further limiting access to the front seat compartment of said vehicle.

14. The anti-theft device of claim 13, further including joints for adjusting the length of said side arms, permitting said extension member to rest on the upper surface of a seat of said vehicle.

15. The anti-theft device of claim 13, further including a locking device for locking said first cross bar in said armed position.

16. The anti-theft device of claim 1, further including locking devices connected to said side arms for engagement with doors of said vehicle to maintain the doors in a locked condition when said anti-theft device is in said armed position.

17. The anti-theft device of claim 16, wherein said locking devices comprise a pair of pins on said side arms and a slotted bracket attached to said doors.

18. The anti-theft device of claim 1, in combination with at least one front seat disposed in said front seat area of said vehicle and extending between said proximal ends of said first pair of side arms.

19. In combination, the anti-theft device of claim 18, further comprising a vehicle body, said hinge devices which correspond respectively to said first pair of side arms being attached to said vehicle body adjacent to said sides of the front seat area of said vehicle and adjacent to said at least one front seat.

20. The anti-theft device of claim 1, further comprising a steering wheel locking device for locking said first cross bar to a steering wheel of said vehicle.

21. The anti-theft device of claim 20, wherein said steering wheel locking device comprises an arcuate body for being attached between said steering wheel and a corresponding portion of said first cross bar.

22. The anti-theft device of claim 21, wherein said arcuate body comprises a loop for passing around said steering wheel and said first cross bar.

23. The anti-theft device of claim 1, wherein said cross bar includes a joint for adjusting the length thereof.

24. In combination, the anti-theft device of claim 1, further comprising a vehicle body, said hinge devices which correspond respectively to said first pair of side arms being attached to said vehicle body adjacent to said sides of the front seat area of said vehicle.

25. An anti-theft device for an automotive vehicle for restricting access to a front seat area and a dashboard area of said vehicle, said device comprising:
   a first pair of side arms for being pivotably attached at proximal ends thereof adjacent to sides of the front seat area of said vehicle;
   at least a first cross bar attached to distal ends of said side arms, for extending said first cross bar transversely across said front seat area of said vehicle in an armed position;
   said side arms and said cross bar being pivotable for being positioned away from said front seat area in a storage position during normal use of said vehicle; and a second cross bar attached to said side arms and disposed for extending transversely across and thereby restricting access to said dashboard area of said vehicle when said device is in the armed position.

26. The anti-theft device of claim 25, wherein said second cross bar extends transversely and upward with respect to said side arms.

27. An anti-theft device for an automotive vehicle for restricting access to a front seat area and a dashboard area of said vehicle, said device comprising:

a first pair of side arms for being pivotably attached at proximal ends thereof adjacent to sides of the front seat area of said vehicle;

at least a first cross bar attached to distal ends of said side arms, for extending said first cross bar transversely across such front seat area of said vehicle in an armed position;

said side arms and said cross bar being pivotable for being positioned away from such front seat area in a storage position during normal use of said vehicle; and a second cross bar pivotably attached to said distal ends of said side arms.

28. The anti-theft device of claim 27, further including a locking device for locking said second cross bar in a selected angular position relative to said first cross bar.

29. The anti-theft device of claim 27, further including a barrier for extending transversely across and thereby restricting access through a space defined between said first cross bar and said second cross bar.

30. The anti-theft device of claim 29, wherein said barrier includes a rigid screen.

* * * * *